US012575553B2

(12) United States Patent
Serrat

(10) Patent No.: US 12,575,553 B2
(45) Date of Patent: Mar. 17, 2026

(54) SYSTEM FOR TREATING PLANTS ESPECIALLY IN AGRICULTURE BY APPLYING A COMPLIMENTARY PRODUCT DOSE BASED ON IMAGE ANALYSIS

(71) Applicant: BILBERRY SAS, Gentilly (FR)

(72) Inventor: Hugo Serrat, Gentilly (FR)

(73) Assignee: BILBERRY SAS, Gentilly (FR)

( * ) Notice: Subject to any disclaimer, the term of this patent is extended or adjusted under 35 U.S.C. 154(b) by 255 days.

(21) Appl. No.: 18/371,989

(22) Filed: Sep. 22, 2023

(65) Prior Publication Data

US 2024/0081314 A1     Mar. 14, 2024

Related U.S. Application Data

(63) Continuation of application No. PCT/IB2022/052598, filed on Mar. 22, 2022.

(30) Foreign Application Priority Data

Mar. 26, 2021     (FR) ...................................... 2103068

(51) Int. Cl.
A01M 7/00          (2006.01)
(52) U.S. Cl.
CPC ........ A01M 7/0089 (2013.01); A01M 7/0042 (2013.01); A01M 7/006 (2013.01)
(58) Field of Classification Search
CPC ... A01M 7/0042; A01M 7/006; A01M 7/0089
(Continued)

(56) References Cited

U.S. PATENT DOCUMENTS

| | | | |
|---|---|---|---|
| 7,311,004 | B2 | 12/2007 | Giles |
| 10,499,632 | B2 | 12/2019 | MacKenzie |

(Continued)

FOREIGN PATENT DOCUMENTS

| | | |
|---|---|---|
| WO | 2016/144795 A1 | 9/2016 |
| WO | 2018/141995 A1 | 8/2018 |

(Continued)

OTHER PUBLICATIONS

International Preliminary Report on Patentability for Application No. PCT/IB2022/052598, mailed Sep. 12, 2023, 7 pages.
(Continued)

*Primary Examiner* — Brady W Frazier

(57)          ABSTRACT

A system for treating plants includes a spray boom provided with a plurality of spray nozzles distributed over the boom and fed by a spray control device, a set of cameras capable of taking images of an area to be treated, and a digital processing device capable of analyzing the images taken by the camera, identifying plants to be treated, and applying instructions to the spray control device in view of spraying at least one product onto plants to be treated, According to the invention, the spray nozzles and the spray control device are configured to apply a generally uniform dose of a product to the area to be treated, independently of the identification of the plants to be treated in the images, and to apply locally a complementary dose of a product to plants to be treated identified by the digital processing device.

To be used in particular in agriculture or in the treatment of non-cultivated spaces.

6 Claims, 3 Drawing Sheets

(58) Field of Classification Search
USPC ........................................................ 239/172
See application file for complete search history.

(56)                     References Cited

U.S. PATENT DOCUMENTS

| 10,719,709 B2 | 7/2020 | Zemenchik |
| 10,721,859 B2 | 7/2020 | Wu et al. |
| 2002/0100819 A1* | 8/2002 | Taylor ................. B05B 13/0278 |
| | | 239/543 |
| 2012/0297674 A1* | 11/2012 | MacKenzie ......... A01M 7/0089 |
| | | 700/240 |
| 2017/0358106 A1 | 12/2017 | Yoshimura et al. |
| 2018/0111148 A1 | 4/2018 | Batcheller et al. |
| 2019/0311198 A1* | 10/2019 | Zemenchik ............ G06V 10/56 |
| 2022/0192084 A1* | 6/2022 | Mizushima ......... A01M 7/0089 |

FOREIGN PATENT DOCUMENTS

| WO | 2018/142371 A1 | 8/2018 |
| WO | 2018/154490 A1 | 8/2018 |

OTHER PUBLICATIONS

International Search Report for Application No. PCT/IB2022/052598, mailed Jun. 17, 2022, 2 pages.
International Search Report for Application No. PCT/IB2022/052604, mailed Jun. 17, 2022, 2 pages.
International Preliminary Report on Patentability for Application No. PCT/IB2022/052604, mailed Sep. 12, 2023, 6 pages.

* cited by examiner

SYSTEM FOR TREATING PLANTS ESPECIALLY IN AGRICULTURE BY APPLYING A COMPLIMENTARY PRODUCT DOSE BASED ON IMAGE ANALYSIS

CROSS REFERENCE TO RELATED APPLICATIONS

This application is a continuation of International Application No. PCT/IB2022/052598, filed Mar. 22, 2022, which claims priority to French Patent Application No. FR2103068, filed Mar. 26, 2021, the entire contents of which are incorporated herein by reference for all purposes.

FIELD OF THE INVENTION

In general, this invention relates to the field of plant treatment.

STATE OF THE ART

From WO2018142371A1, WO2018141995A1, and WO2018154490A1 on behalf of the applicant, methods and systems for selectively treating plants in cultivated areas or railway areas are already known. Such a system comprises a spray boom moved by a tractor and fitted with a plurality of spaced-apart spray nozzles. The boom also comprises one or more cameras capturing images of the field while the system is being moved, and one or more processing units which, by means of learning-based image recognition techniques, can recognize plants in the captured images, and control the spray nozzles in real time to locally apply treatment, e.g. a herbicide treatment, only where the presence of plants to be treated is detected.

This system allows for the use of treatment products, such as plant protection products, to be considerably reduced with respect to a conventional solution where all nozzles are fed simultaneously and continuously when the system is moving in an area to be treated.

However, one issue related to spot spraying triggered by the recognition of plants to be treated is due to the fact that some plants to be treated may be very small and hard to identify. Furthermore, some plants to be treated may be hidden under larger plants and be invisible for the image processing system. As a result, the effective spraying rate of species to be treated can be considerably less than 100%, thereby losing a substantial portion of the advantage of spot spraying.

SUMMARY OF THE INVENTION

The object of the present invention is to limit such disadvantages.

For this purpose, a plant treatment system is proposed, comprising a spray boom with a plurality of spray nozzles distributed over the boom and supplied by a spray control device, the system comprising a set of cameras which can take images of an area to be treated, a digital processing device capable of analyzing the images taken by the camera, identifying plants to be treated, and applying instructions to the spray control device in view of spraying at least one product onto plants to be treated, the system being characterized in that the spray nozzles and the spray control device are configured to apply a generally uniform dose of a product to the area to be treated, independently of the identification of the plants to be treated in the images, and to apply locally a complementary dose of a product to plants to be treated identified by the digital processing device.

Preferred aspects of the system include the following optional additional characteristics, taken individually or in any combination the person skilled in the art may devise, such as the product applied for the generally uniform dose, and the product applied as a complementary dose is the same product.

the product applied for the generally uniform dose, and the product applied as a complementary dose are different products.

the system comprises two rows of nozzles distributed along the boom, a first row being capable of applying the generally uniform product dose, and a second row being capable of applying the local complementary dose to the plants identified.

the two rows of nozzles are connected to a common product container via a supplying device.

for the first row of spray nozzles, the supplying device comprises an individual control valve for each nozzle.

for the second row of nozzles, the supplying device comprises a common control valve for at least one group of nozzles.

for the second row of nozzles, the supplying device comprises a control valve for each nozzle.

the system comprises a row of nozzles distributed along the boom and which are associated with respective control valves having more than two opening states, the spray control device being capable of simultaneously bringing the control valves into a first state allowing for the generally uniform product dose to be applied, and of occasionally bringing at least one nozzle identified from plant recognition by the digital processing device into a second state in which the product dose is increased.

the control valves have proportional control.

the generally uniform product dose is a fraction of a recommended nominal dose for the product concerned.

the complementary product dose, added to the generally uniform dose, results in approximately a nominal dose recommended for the product concerned.

BRIEF DESCRIPTION OF THE DRAWINGS

Further aspects, objects, and advantages of the present invention will be more apparent from reading the following detailed description of preferred embodiments thereof, provided by way of a non-limiting example and with reference to the appended drawings.

In the drawings.

DETAILED DESCRIPTION

Figure 1:
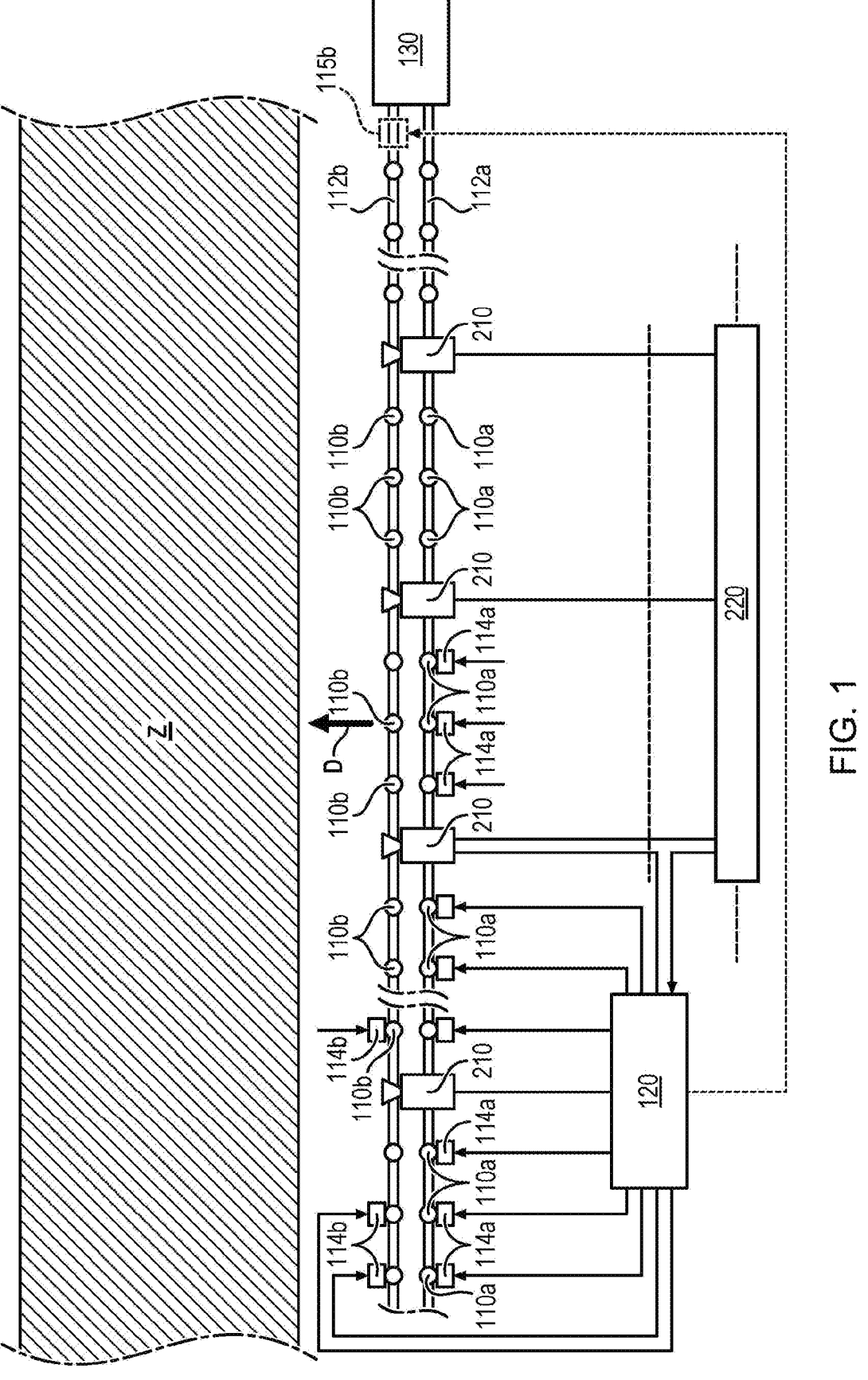
FIG. 1 is a schematic partial top view of a spray boom according to a first embodiment of the present invention.
Figure 2:
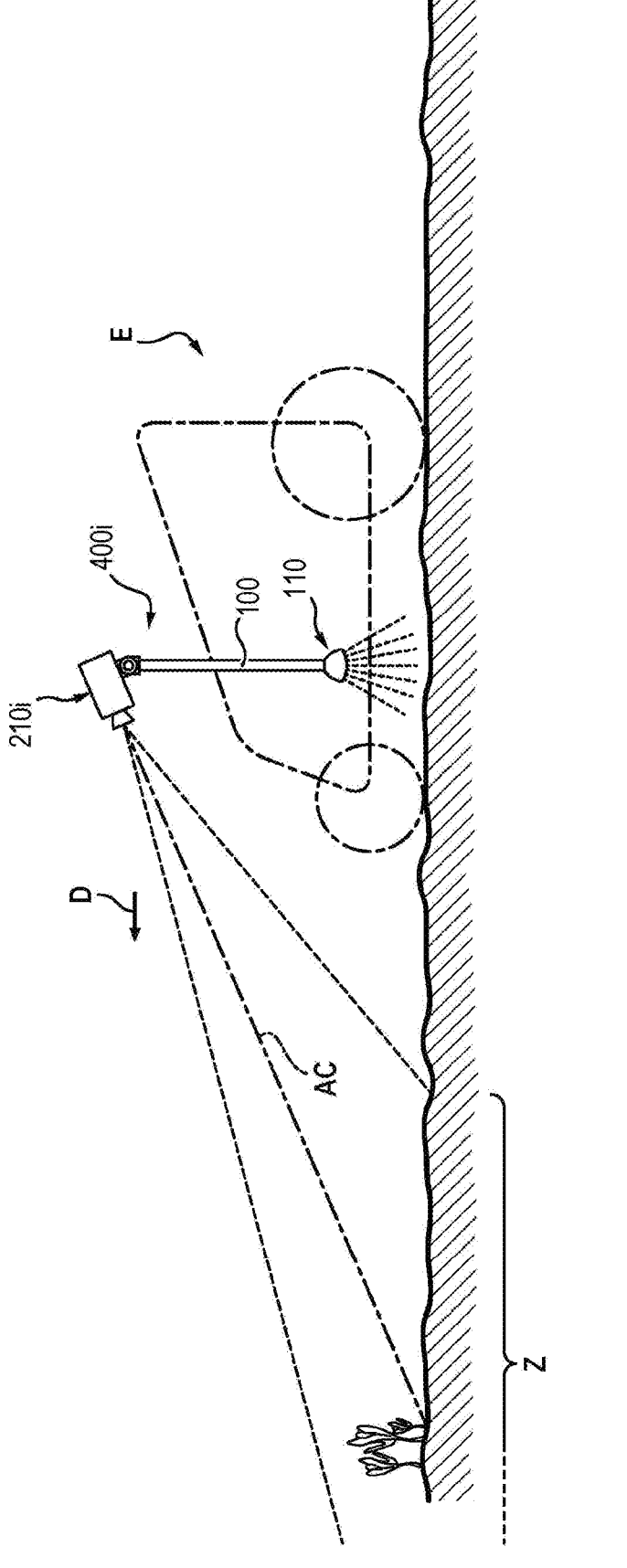
FIG. 2 is a partial side elevation view of the spray boom of FIG. 1.

With reference to FIGS. 1 and 2, a spray boom 10 is depicted which comprises a support structure 100, which is metallic for example, and two sets of spray nozzles, both distributed over the extension of the boom 10.

A first series of spray nozzles 110*a* is fed by a first common line or tubing 112*a* connected to a source 130 of liquid to be sprayed under pressure, while a second series of spray nozzles 110b is fed by a second common line or tubing 112b also connected to the source 130 of liquid to be sprayed under pressure.

At least at the first series of nozzles 110a, spraying is controlled by a plurality of control valves 114a mounted between the common line 112a and the respective nozzle, so that each valve can be opened selectively, independently of the others, at any desired time, and thus the corresponding nozzle can be put to the line 112a for spraying the liquid.

With respect to the second series of nozzles 110b, either a plurality of control valves 114b associated with respective nozzles and capable of individually communicating the nozzles with the common line 112b, or (as illustrated in dashed lines) a single common valve 115b mounted between the container 130 of liquid to be spread and the line 112b is provided.

The different control valves are controlled by a spray control unit 120. The control valves are preferably commercially available solenoid valves with PWM (pulse width modulation) control which allow for proportional control of the average rate and thus the dose applied to the plants per time unit.

The boom is either incorporated into a machine E, or towed by a machine, or carried by a machine, wherein the machine may be in particular an agricultural tractor or a road or railway vehicle for treating a non-cultivated space.

The boom 110 further carries a set of cameras 210 the axes AC of which are herein oriented in a direction from above in vertical planes parallel to the direction of travel D of the machine and capable of taking images of an area Z where the boom 100 is moving in order to identify plants to be treated. The plants can be weeds on which a herbicide is to be sprayed selectively, or can be cultivated plants on which a phytosanitary product (insecticide, fertilizer, growth regulator, etc.) is to be sprayed selectively. In a variant not shown, the cameras can be oriented vertically downwards.

The cameras 210 are connected to one or more digital processing units 220 capable of analyzing the images taken by the cameras in order to determine the presence of target plants to be treated. This analysis is done for example by decomposing each image into sub-images of a determined size, applying a convolution function to each of the sub-images by using weight matrices, and determining a probability of the presence of a target plant depending on the result of the convolution. Documents WO2018142371A1 and WO2018141995A1 on behalf of the applicant describe such techniques.

As the case may be, each boom comprises any complementary equipment, such as a height measuring device, a device for controlling the position or the geometry of the boom, a lighting system, etc.

Each time a plant to be treated is found in an image by the processing unit 220 the position thereof in the image allows the real position thereof in the area being treated to be inferred, and corresponding data is transmitted to the spray control unit 120.

According to one aspect of the invention, the control unit 120 is capable of controlling the spraying operation so that first of all, while the machine is moving, the area to be treated is spayed uniformly using all of the second series of nozzles 110b. Preferably, the control circuit 120 and/or the composition of the nozzle supplying circuit are configured so that the dose applied by the nozzles 110b is substantially uniform throughout the area to be treated, especially considering head loss in the supplying line 112b. Such uniform spraying is implemented independently of the detection by the vision system comprising the cameras 210 and the processing unit 220 of the actual presence or not of plants to be treated in the area Z.

Preferably the dose applied for such uniform spraying (in general defined by a product weight or volume per surface unit treated) is a fraction, e.g. 10 to 40%, preferably about 20% in case of a herbicide, of the recommended nominal dose, said dose being applied by appropriately controlling the control valve(s) 114b or 115b associated with the second series of nozzles.

In parallel to said continuous operation, the system is configured, when a plant to be treated is identified in an image taken by a camera 210, to perform spot product spraying at the location where the plant has been identified. For this purpose, the processing unit 220 sends the data to the spray control unit 120 which allows the latter to determine which of the nozzles 110a of the first series of nozzles has to be activated and when (depending in particular on the travel speed of the machine), as described in the previous patent applications on behalf of the applicant, and the opening instruction is sent to the corresponding control valve at said time (taking into account possible latency).

The dose for such spot spraying is preferably close to the nominal dose recommended for the product concerned, and for example about 80% of the nominal dose if the nozzles of the second series 112b apply a dose of 20% of the nominal dose. Alternatively, and in case the solenoid valves 112a have proportion control, it can be envisaged for the dose to be adjusted depending on one or more criteria, such as the type of plant detected, the development stage of the plant as estimated by the vision system 210, 220, and/or other factors such as environmental conditions, the travel speed of the machine, etc.

Thus, the nozzles 110a of the first series allow for spot treatment with guaranteed efficiency to be carried out at the plants to be treated detected by the vision system 210, 220, while the nozzles 110b of the second series will apply a safety treatment to the whole area in order to thereby treat plants which might have gone undetected by the vision system for any reason (plant too small, hidden plant, plant not classified during the recognition process, etc.).

Figure 3:
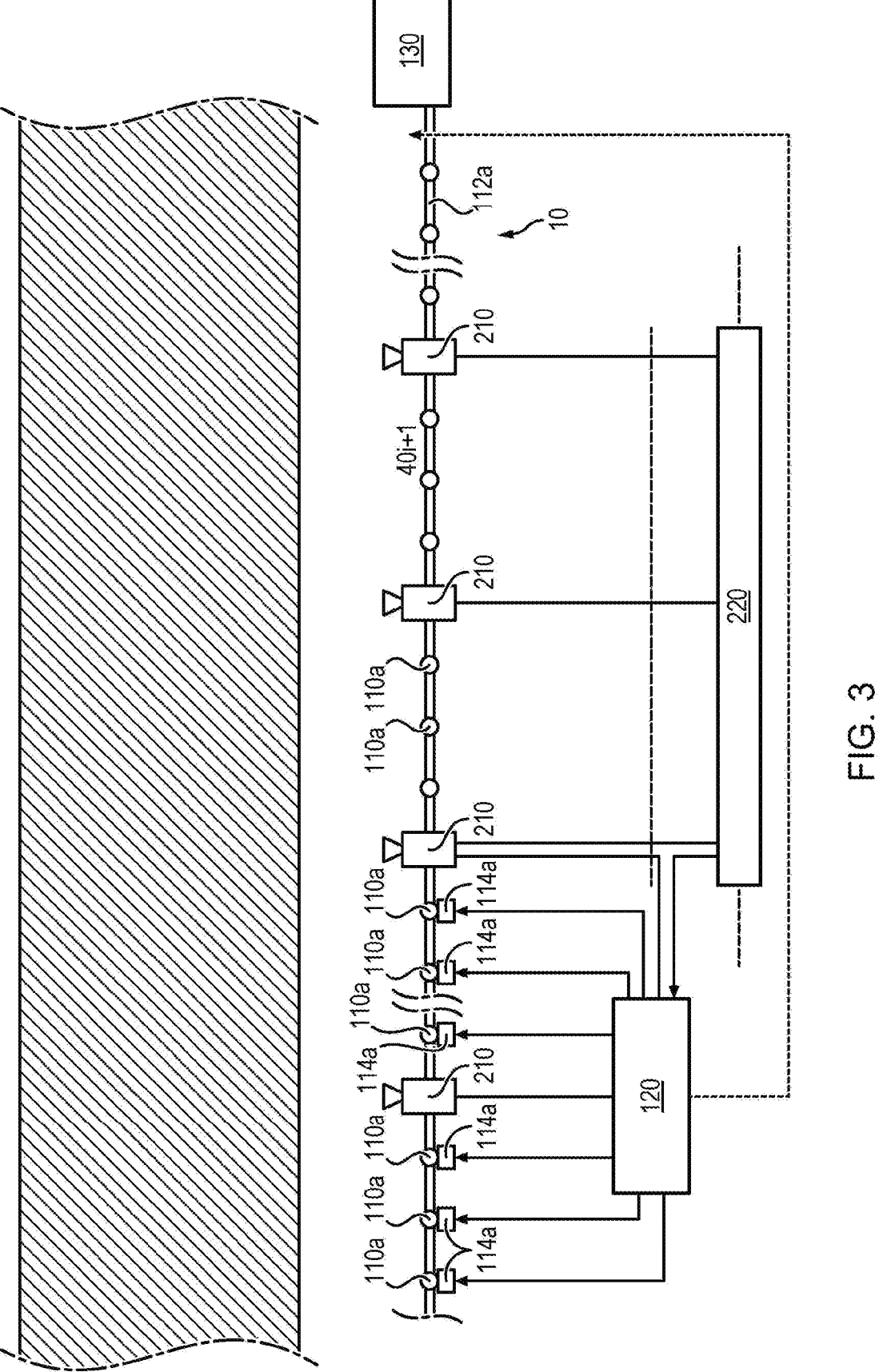
FIG. 3 is a schematic partial top view of a spray boom according to a second embodiment of the present invention.

In a second embodiment and with reference to FIG. 3, the boom has a single series of nozzles 110a, each nozzle being connected to a common supplying line 112a via a respective control valve.

In this embodiment, each valve 112a has proportional control in that it can release a product dose varying depending on an instruction in turn varying between 0 and 100%.

In steady state, the valves 112a are controlled so that each of the nozzles 110a will release a product dose for example of 10 to 40% of the nominal dose, preferably about 20% in case of a foliar herbicide.

When a plant to be treated is identified by the vision system 210, 220, the relevant nozzle and the starting and ending time of the spot treatment are determined at the processing unit 220 and the control unit 120. The control valve of the relevant nozzle is also controlled by the control unit 120 so as to carry out between the calculated beginning and end time a larger opening of the control valve 112a associated with the relevant nozzle so as to carry out during this time window a spraying operation with a higher dose, e.g. with the nominal dose for the product involved.

Thus, the same advantages as for the first embodiment can be obtained.

Of course, the present invention is by no means limited to the embodiments described and depicted, but the person skilled in the art will be able to apply numerous variants and modifications. In particular:

a "nozzle" means both a single nozzle or a group or cluster of nozzles, e.g. nozzles operating in different directions and/or having different spraying geometries;

in the case of a group of nozzles, the associated control valves may include one valve for each nozzle, one valve for each group, or one valve for a subgroup;

the control valves, be they of the on-off type or with proportional control, can be made by any suitable technology in that they are incorporated into the nozzles or separated from the nozzles;

the system of the first embodiment can be used to apply two different products, for example a uniformly wetting product by means of the second series of nozzles, and a spot treatment product by means of the first series of nozzles;

the activation of a relevant nozzle for spot spraying also includes the activation of a set of neighboring nozzles;

a "digital processing unit" means both a single processing device and a set of processing devices, in particular for parallel processing, possibly distributed over different locations of the plant treatment system and associated with respective cameras or respective groups of cameras.

The present invention relates to agriculture as well as to any field where plant treatment may be required, for example application of a herbicide to weeds, in particular the treatment of areas in the field of transport, urban management, etc. It can be implemented by decision of an operator depending on his or her field observation and on the operations to be carried out.

Alternatively, it can be implemented in an automated or semi-automated manner depending for example on image analysis of a sample of the field to be treated, wherein the choice can be either uniform treatment, or spot treatment, or a combination of uniform treatment and spot treatment as described above.

The invention claimed is:

1. A plant treatment system, comprising a spray boom provided with a plurality of spray nozzles distributed over the boom and controlled by a spray control unit, the system comprising a set of cameras which can take images of an area to be treated, a digital processing device capable of analyzing the images taken by the camera, identifying plants to be treated, and applying instructions to the spray control unit in view of spraying at least one product onto plants to be treated, the system being characterized in that the spray nozzles and the spray control unit are configured to apply a generally uniform dose of a product to the area to be treated, independently of the identification of the plants to be treated in the images, and to apply locally a complementary dose of a product to plants to be treated identified by the digital processing device, the complementary dose being complementary to the generally uniform dose, the system further characterized by two rows of nozzles distributed along the boom, a first row being capable of applying the local complementary dose to the plants identified and a second row capable of applying the generally uniform product dose, an individual control valve for each nozzle in the first row and a common control valve for at least one group of nozzles in the second row of nozzles.

2. The system according to claim 1, characterized in that the product applied for the generally uniform dose, and the product applied as a complementary dose is the same product.

3. The system according to claim 1, characterized in that the product applied for the generally uniform dose, and the product applied as a complementary dose are different products.

4. The system according to claim 1, characterized in that both rows of nozzles are connected to a common product container via a supplying device.

5. A plant treatment system, comprising a spray boom provided with a plurality of spray nozzles distributed over the boom and fed by a spray control unit, the system comprising a set of cameras which can take images of an area to be treated, a digital processing device capable of analyzing the images taken by the camera, identifying plants to be treated, and applying instructions to the spray control unit in view of spraying at least one product onto plants to be treated, the system being characterized in that the spray nozzles and the spray control unit are configured to apply a generally uniform dose of a product to the area to be treated, independently of the identification of the plants to be treated in the images, and to apply locally a complementary dose of a product to plants to be treated identified by the digital processing device, the system being further characterized by a row of the plurality of spray nozzles distributed along the boom that are associated with respective control valves having more than two opening states, the spray control unit being capable of simultaneously bringing the control valves into a first state allowing for the generally uniform product dose to be applied, and of occasionally bringing at least one nozzle identified from plant recognition by the digital processing device into a second state in which the product dose is increased.

6. The system according to claim 5, characterized in that the control valves have proportional control.

*    *    *    *    *